(12) United States Patent
Tatematsu

(10) Patent No.: US 9,247,088 B2
(45) Date of Patent: Jan. 26, 2016

(54) IMAGE FORMING APPARATUS

(71) Applicant: Hirotaka Tatematsu, Nagoya (JP)

(72) Inventor: Hirotaka Tatematsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/041,104

(22) Filed: Sep. 30, 2013

(65) Prior Publication Data
US 2014/0153015 A1   Jun. 5, 2014

(30) Foreign Application Priority Data

Nov. 30, 2012 (JP) .................... 2012-263108

(51) Int. Cl.
*H04N 1/00* (2006.01)
(52) U.S. Cl.
CPC ....... *H04N 1/00599* (2013.01); *H04N 1/00567* (2013.01)
(58) Field of Classification Search
CPC .......... H04N 1/00519; H04N 1/00525; H04N 2201/0094; H04N 1/0057; H04N 1/00599; H04N 1/00567
USPC .................................. 358/296, 474; 399/107
See application file for complete search history.

(56) References Cited

U.S. PATENT DOCUMENTS

| 7,463,842 B2 | 12/2008 | Imada et al. |
| 8,246,035 B2 | 8/2012 | Ito |
| 2006/0182461 A1 | 8/2006 | Imada et al. |
| 2008/0317498 A1* | 12/2008 | Andoh et al. ................. 399/110 |
| 2010/0102500 A1 | 4/2010 | Ito |

FOREIGN PATENT DOCUMENTS

| CN | 1821889 A | 8/2006 |
| CN | 101329523 A | 12/2008 |
| JP | 2005-269681 A | 9/2005 |
| JP | 2010-109573 A | 5/2010 |

OTHER PUBLICATIONS

Nov. 4, 2015—(CN) The First Office Action—App 201310455199.2, Eng Tran.

* cited by examiner

*Primary Examiner* — Marivelisse Santiago-Cordero
*Assistant Examiner* — Kent Yip
(74) *Attorney, Agent, or Firm* — Banner & Witcoff, Ltd.

(57) ABSTRACT

An image forming apparatus is provided that includes a first casing disposed on a first side in a first direction, and a second casing disposed on a second side in the first direction, the second casing containing an image reading unit, a driver driving the image reading unit, and a driver compartment configured to accommodate the driver and disposed at an end portion of the second casing on a third side in a second direction perpendicular to the first direction, the first casing containing an image forming unit, a control board electrically connected with the driver and the image reading unit and configured to control the image reading unit, and a board compartment configured to accommodate at least a part of the control board and disposed at an end portion of the first casing on a fourth side opposite to the third side in the second direction.

11 Claims, 5 Drawing Sheets

IMAGE FORMING APPARATUS

CROSS-REFERENCE TO RELATED APPLICATION

This application claims priority under 35 U.S.C. §119 from Japanese Patent Application No. 2012-263108 filed on Nov. 30, 2012. The entire subject matter of the application is incorporated herein by reference.

BACKGROUND

1. Technical Field

The following description relates to one or more techniques for downsizing an image forming apparatus having an image reading unit configured to read an image on a document sheet.

2. Related Art

An image forming apparatus has been known that includes an image reading unit configured to read an image on a document sheet and an image forming unit configured to form an image on a recording sheet.

For instance, an image forming apparatus has been proposed that has an image reading unit disposed above an image forming unit, and a gear mechanism disposed to protrude downward relative to an upper end face of a document table behind the image forming unit.

SUMMARY

In general, the proposed image forming apparatus includes a control board configured to control operations of the image reading unit.

Therefore, the proposed image forming apparatus needs a space for accommodating the control board, and thus might inevitably have to be of a large size.

Additionally, in general, it is considered that a configuration (element) for driving an image reading unit and a configuration (element) for controlling an image reading unit need to be disposed close to each other. Accordingly, in the proposed image forming apparatus as well, it may be considered that the gear mechanism and the control board need to be disposed such that one of them is stacked on the other in a vertical direction.

However, when the gear mechanism and the control board are disposed such that one of them is stacked on the other in the vertical direction, it might result in a larger size of the image forming apparatus.

Aspects of the present invention are advantageous to present one or more improved techniques that make it possible to downsize an image forming apparatus having an image reading unit configured to read an image on a document sheet.

According to aspects of the present invention, an image forming apparatus is provided, which includes a first casing disposed on a first side in a first direction, and a second casing disposed on a second side opposite to the first side in the first direction, the second casing containing an image reading unit configured to read an image on a document sheet, a driver configured to drive the image reading unit, and a driver compartment configured to accommodate the driver, the driver compartment disposed at a third-side end portion of the second casing that is on a third side in a second direction perpendicular to the first direction, the first casing containing an image forming unit configured to form an image on a recording sheet, a control board electrically connected with the driver and the image reading unit and configured to control the image reading unit, and a board compartment configured to accommodate at least a part of the control board, the board compartment disposed at a fourth-side end portion of the first casing that is on a fourth side opposite to the third side in the second direction.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompanying drawings.

1. Overall Configuration of Printer

Figure 1:
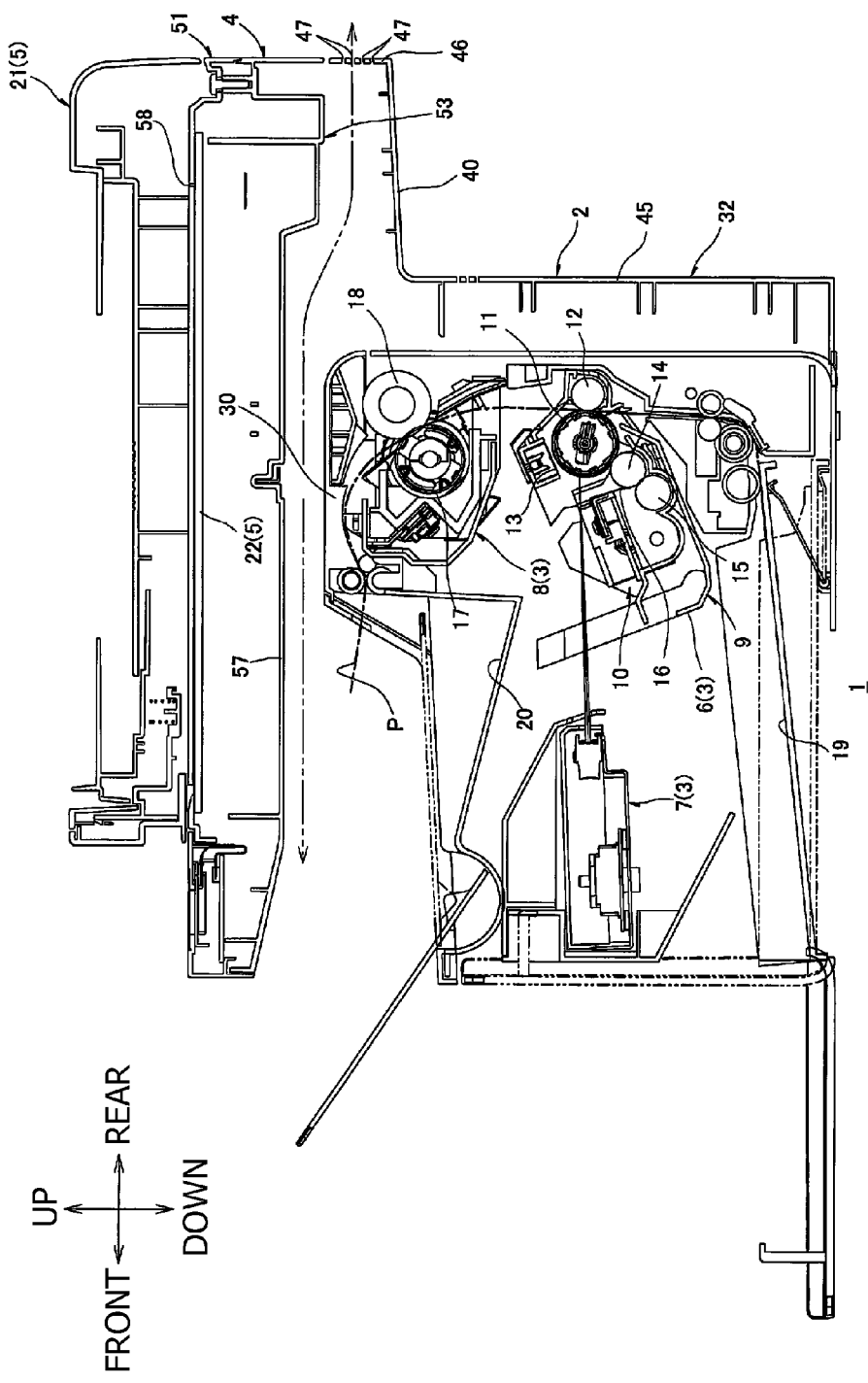
FIG. 1 is a cross-sectional side view showing a configuration of a printer in an embodiment according to one or more aspects of the present invention.

As shown in FIG. 1, a printer 1 of an embodiment according to aspects of the present invention is a multi-function peripheral provided integrally with an image forming unit 3 held in a main body casing 2 and an image reading unit 5 held in a scanner frame 4.

It is noted that, in the following descriptions, each direction of the printer 1 is defined as shown in the accompanying drawings, in which a vertical direction of the printer 1 is defined in a state where the printer 1 is horizontally installed.

The image forming unit 3 includes a process unit 6, an exposure unit 7, and a fuser unit 8, and is configured to form an image on a sheet P.

The process unit 6 is disposed substantially in a middle of the main body casing 2 in the vertical direction. The process unit 6 includes a drum unit 9 and a development unit 10.

The drum unit 9 includes a photoconductive drum 11, a transfer roller 12, and a scorotron-type charger 13.

The photoconductive drum 11 is formed substantially in a cylindrical shape extending in a left-to-right direction, and is rotatably provided at a rear portion of the drum unit 9.

The transfer roller 12 is rotatably provided behind the photoconductive drum 11. The transfer roller 12 is pressed against and in contact with the photoconductive drum 11 from behind.

The scorotron-type charger 13 is disposed above the photoconductive drum 11 so as to face the photoconductive drum 11 across a distance.

The development unit 10 includes a development roller 14, a supply roller 15, and a layer thickness regulating blade 16.

The development roller 14 is rotatably provided at a rear end portion of the development unit 10. Further, the development roller 14 is configured to contact the photoconductive drum 11 from a lower front side of the photoconductive drum 11 (the development roller 14 is configured to contact a lower front portion of the photoconductive drum 11).

The supply roller 15 is rotatably provided at a lower front side of the development roller 14. In addition, the supply roller 15 is configured to contact the development roller 14 from the lower front side of the development roller 14 (the supply roller 15 is configured to contact a lower front portion of the development roller 14).

The layer thickness regulating blade 16 is disposed at an upper front side of the development roller 14. The layer thickness regulating blade 16 is configured to contact the development roller 14 from a front side of the development roller 14 (the layer thickness regulating blade 16 is configured to contact a front portion of the development roller 14).

A space in front of the supply roller 15 and the layer thickness regulating blade 16 is configured to store toner.

The exposure unit 7 is disposed at a front side of the process unit 6, substantially in a middle of the main body casing 2 in the vertical direction. The exposure unit 7 is configured to emit a laser beam L to the photoconductive drum 11 on the basis of image data and expose an outer circumferential surface of the photoconductive drum 11.

The fuser unit 8 is disposed above the process unit 6, at an upper rear end portion of the main body casing 2. The fuser unit 8 includes a heating roller 17 and a pressing roller 18 that is pressed against and in contact with the heating roller 17 from an upper rear side of the heating roller 17.

When a print job is input to the printer 1, and an image forming operation is started, the toner in the development unit 10 is charged due to friction between the supply roller 15 and the development roller 14, and then carried on a surface of the development roller 14 as a thin layer having an even thickness regulated by the layer thickness regulating blade 16.

On the other hand, the surface of the photoconductive drum 11 is evenly charged by the scorotron-type charger 13, and thereafter exposed by the exposure unit 7. Thereby, on the surface of the photoconductive drum 11, formed is an electrostatic latent image based on the image data. Then, when the toner carried on the development roller 14 is supplied to the electrostatic latent image on the surface of the photoconductive drum 11, a toner image is carried on the surface of the photoconductive drum 11.

Sheets P placed on a sheet holder 19, which is disposed at a bottom portion of the main body casing 2, are fed between the photoconductive drum 11 and the transfer roller 12 on a sheet-by-sheet basis at predetermined timing in response to rotations of various rollers. Then, the toner image is transferred onto a sheet P when the sheet P passes between the photoconductive drum 11 and the transfer roller 12, and consequently, the image is formed on the sheet.

Subsequently, the sheet P is heated and pressed when passing between the heating roller 17 and the pressing roller 18. At this time, the image is thermally fixed onto the sheet P. Afterward, the sheet P is ejected onto a catch tray provided on an upper wall of the main body casing 2.

Thus, the sheet P is conveyed from the sheet holder 19 to the catch tray 20 in the image forming operation by the printer 1, through a conveyance path (indicated by an alternate long and short dash line in FIG. 1) that is formed substantially in a C-shape when viewed in the left-to-right direction.

The image reading unit 5 is disposed above the catch tray 20 with a distance therebetween. The image reading unit 5 is a flatbed scanner employing a contact image sensor (CIS) as a reading sensor. The image reading unit 5 includes a document cover 21 and a reading window 22 that includes a glass plate. The image reading unit 5 is configured to read out image information of a document sheet placed between the reading window 22 and the document cover 21 by moving the reading sensor (not shown) relative the document sheet. It is noted that the printer 1 is configured to perform an image forming operation as described above, based on the image information read out from the document sheet by the image reading unit 5.

2. Details about Main Body Casing

Figure 2:
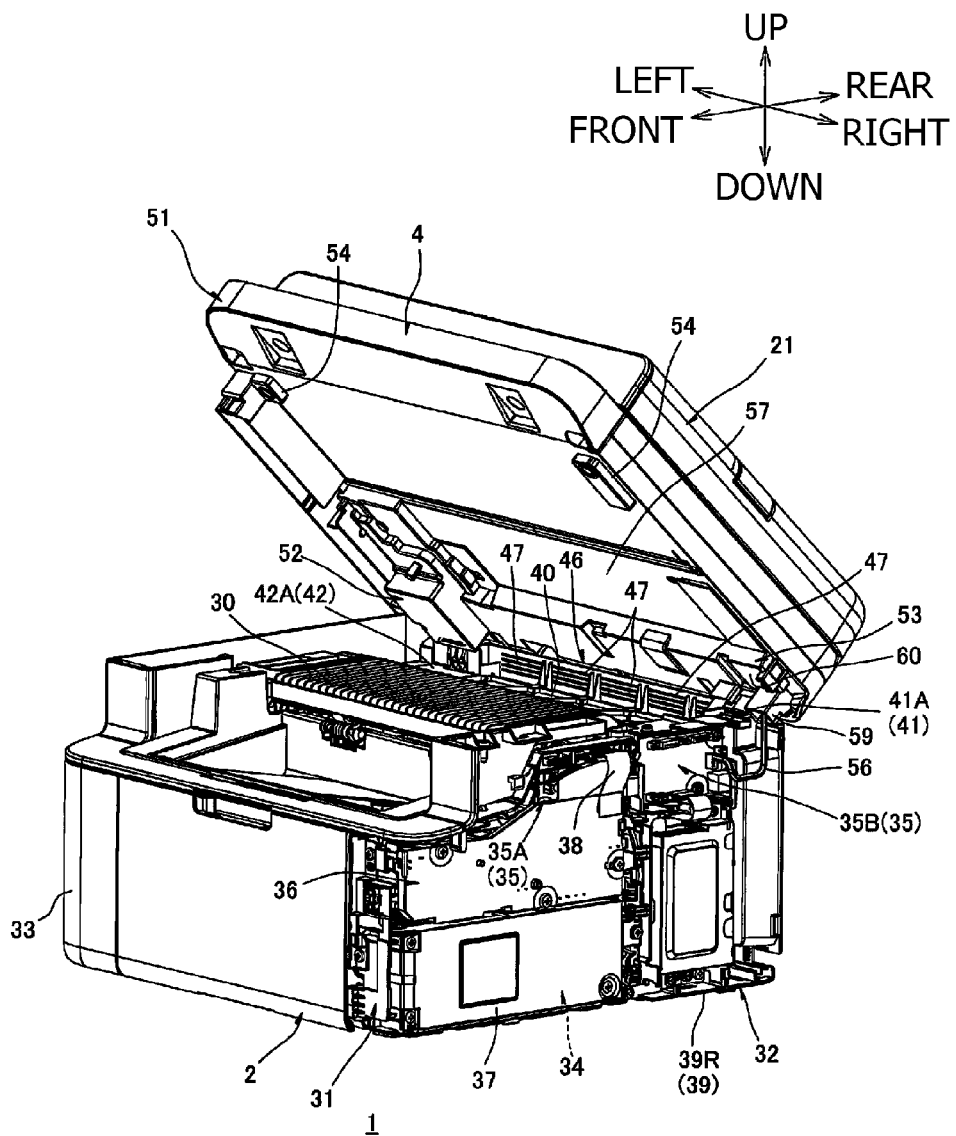
FIG. 2 is a perspective view of the printer (in a state where a right side cover is removed therefrom) from a right front side in the embodiment according to one or more aspects of the present invention.
Figure 3:
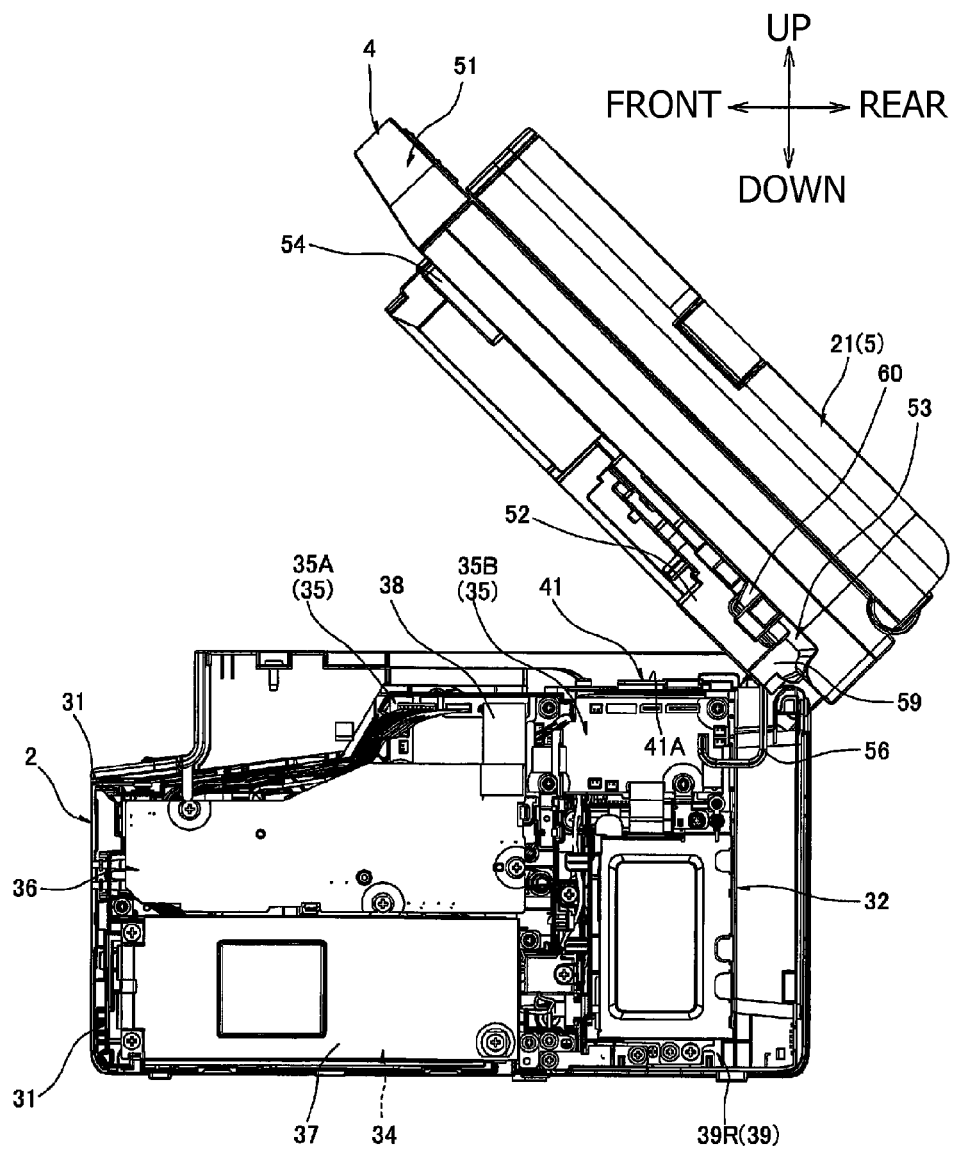
FIG. 3 is a right side view of the printer in the state where the right side cover is removed therefrom in the embodiment according to one or more aspects of the present invention.

As shown in FIGS. 1 and 2, the main body casing 2 includes two first supporting frames (a left first supporting frame and a right first supporting frame) 31, a fuser cover 30, a second supporting frame 32, and two side covers (a left side cover and a right side cover) 33. In the following descriptions, a detailed explanation will be provided about a configuration of the right first supporting frame 31, but an explanation may be omitted about a configuration of the left first supporting frame 31.

The two first supporting frames 31 are disposed to face each other across a distance in the left-to-right direction. The process unit 6, the exposure unit 6, and the fuser unit 8 are supported between the two first supporting frames 31. Namely, the aforementioned conveyance path of the sheet P is formed between the two first supporting frames 31. Each first supporting frame 31 is formed substantially in a rectangular frame shape when viewed in the left-to-right direction. Further, the right first supporting frame 31 supports a low-voltage power supply board 34, a high-voltage power supply board 36, and a main control board 35. Moreover, the left first supporting frame 31 supports a motor (not shown) and a gear train (not shown) for driving the image forming unit 3.

The low-voltage power supply board 34 is supported by a lower half portion of the (right) first supporting frame 31. The low-voltage power supply board 34 is configured to convert an alternating current input to the printer 1 from an external power supply into a direct current. The low-voltage power supply board 34 is covered with a metal cover plate 37.

The high-voltage power supply board 36 is disposed above the low-voltage power supply board 34 and supported by the (right) first supporting frame 31. The high-voltage power supply board 36 is formed in a shape of a rectangular flat plate extending in the front-to-rear direction, when viewed in the left-to-right direction. The high-voltage power supply board 36 is electrically connected with the low-voltage power supply board 34. The high-voltage power supply board 36 includes an electric transformer (not shown). The high-voltage power supply board 36 is configured to change a direct current received from the low-voltage power supply board 34 into a predetermined voltage, and supply the predetermined voltage to the scorotron-type charger 13, the transfer roller 12, the development roller 14, and the supply roller 15.

The main control board 35 is disposed on a left side of a rear end portion of the high-voltage power supply board 36 with a distance between the main control board 35 and the high-voltage power supply board 36. The main control board 35 is formed in a shape of a rectangular flat plate extending in the front-to-rear direction, when viewed in the left-to-right direction. A front half 35A of the main control board 35 is supported by an upper end portion of the (right) first supporting frame 31, and a rear half 35B of the main control board 35 is supported by an upper end portion of the second supporting frame 32. A lower end portion of the front half 35A of the main control board 35 and an upper end portion of the high-voltage power supply board 36 overlap each other when projected in the left-to-right direction. The main control board 35 is electrically connected with the low-voltage power supply board 34. Further, the main control board 35 is connected with the high-voltage power supply board 36 via a signal wire 38. In addition, the main control board 35 is configured to control an operation of the image reading unit 5 by controlling and driving a below-mentioned motor 55.

The fuser cover 30 is disposed between the upper end portions of the two first supporting frames 31, so as to cover the fuser unit 8. The fuser cover 30 is formed substantially in a flat plate shape extending in the left-to-right direction.

As shown in FIGS. 1, 2, 4, and 5, the second supporting frame 32 is disposed behind the process unit 6 and the fuser unit 8. The second supporting frame 32 is formed substantially in a U-shape of which a lower side is open, in a cross-sectional rear (front) view. The second supporting frame 32 includes two side walls (a left-side wall and a right-side wall) 39, a front wall 45, an upper wall 40, and a rear wall 46.

The two side walls 39 are disposed to face each other across a distance in the left-to-right direction. In the following descriptions, the left-side one of the side walls 39 will be referred to as the "left wall 39L," and the right-side one will be referred to as the "right wall 39R."

The right wall 39R is formed substantially in a bottomed rectangular frame shape that extends vertically and has a right end closed, in a side view (when viewed along the left-to-right direction). The right wall 39R is provided with a board compartment 41. Further, in an upper end portion of the right wall 39R, the rear half 35B of the main control board 35 is supported.

The board compartment 41 extends upward continuously from the upper end portion of the right wall 39R. The board compartment 41 is formed substantially in a rectangular frame shape of which a right end, a front end, and a lower end are open. The upper end portion of the board compartment 41 is disposed to overlap the upper end portion of the right first supporting frame 31 when projected in the front-to-rear direction. Further, inside the board compartment 41, the rear half 35B of the main control board 35 is supported.

The left wall 39L is formed substantially in a bottomed rectangular frame shape that extends vertically and has a left end closed, in a side view (when viewed along the left-to-right direction). The left wall 39L is provided with a driver-side facing portion 42.

The driver-side facing portion 42 is an upper wall of the left wall 39L formed substantially in a flat plate shape extending in the left-to-right direction. An upper face 42A of the driver-side facing portion 42 is disposed lower than an upper face 41A of the board compartment 41. Further, the upper face 42A of the driver-side facing portion 42 is disposed lower than an upper end portion of the main control board 35.

Figure 4:
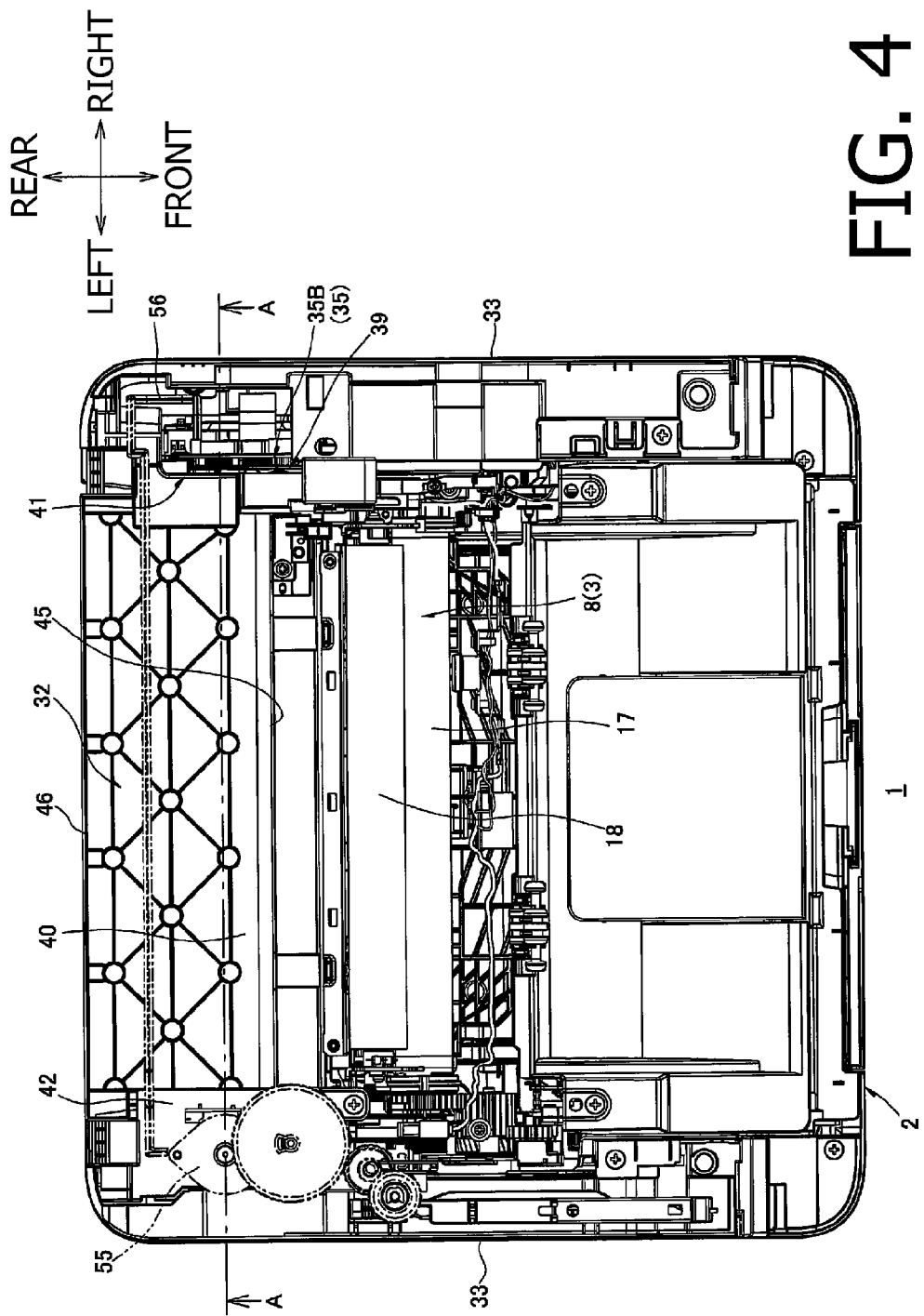
FIG. 4 is a top view of a main body casing of the printer in a state where a fuser cover is removed from the main body casing in the embodiment according to one or more aspects of the present invention.

As shown in FIGS. 1 and 4, the front wall 45 is provided to bridge a distance between front end portions of the two side walls 39. The front wall 45 is formed substantially in a flat plate shape extending vertically.

The upper wall 40 is provided to bridge a distance between upper end portions of the two side walls 39. The upper wall 40 is formed substantially in a flat plate shape extending in the left-to-right direction. A left end portion of the upper wall 40 is formed to be continuous with a right end portion of the driver-side facing portion 42. Additionally, a right end portion of the upper wall 40 is formed to be continuous with a left face of the right wall 39R, below the board compartment 41.

The rear wall 46 extends upward continuously from a rear end portion of the upper wall 40, and is formed substantially in a flat plate shape extending in the left-to-right direction. Further, the rear wall 46 includes a plurality of slits 47 formed therein.

Figure 5:
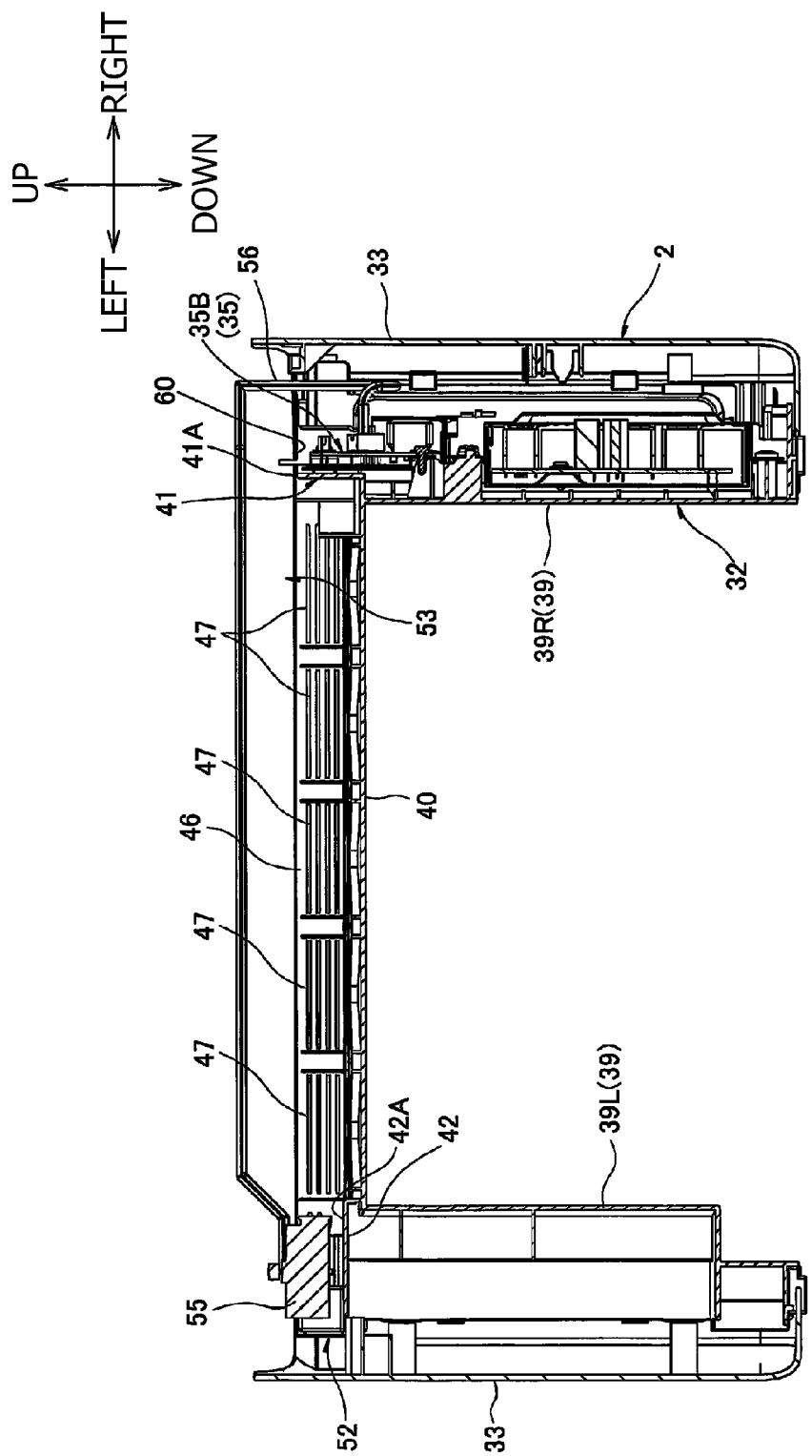
FIG. 5 is a cross-sectional view of the main body casing taken along an A-A line shown in FIG. 4 in the embodiment according to one or more aspects of the present invention.

As shown in FIG. 5, in a middle portion of the rear wall 46 in the left-to-right direction, the slits 47 are arranged in parallel in the vertical direction at intervals of a distance, and are aligned along the left-to-right direction at intervals of a distance. Each slit 47 is configured to penetrate the rear wall 46, and is formed substantially in a straight line shape extending in the left-to-right direction.

As shown in FIGS. 4 and 5, each of the two side covers 33 is configured to cover, from outside in the left-to-right direction, a corresponding one of the first supporting frames 31 and the second supporting frame 32. Each side cover 33 is formed substantially in a flat plate shape extending in the front-to-rear direction and the vertical direction.

3. Details about Scanner Frame

As shown in FIGS. 1 and 2, the scanner frame 4 is disposed to face the main body casing 2, above the main body casing 2. The scanner frame 4 includes a frame main body 51 and the aforementioned document cover 21.

The frame main body 51 is configured to form a lower half of the scanner frame 4, and is formed substantially in a box shape flattened in the vertical direction. The frame main body 51 includes an opening 58 formed in an upper wall thereof. The opening 58 is closed by the reading window 22. Further, the frame main body 51 includes a motor compartment 52, a wire compartment 53, and two legs (left and right legs) 54. The frame main body 51 is configured to support the motor 55.

The motor compartment 52 protrudes downward from a left rear end portion of a lower wall 57 of the frame main body 51, and is formed substantially in a rectangular tube shape of which lower end is closed.

The wire compartment 53 is disposed at a rear end portion of the lower wall 57 of the frame main body 51. The wire compartment 53 extends rightward from a right end portion of the motor compartment 52, and is formed substantially in a rectangular tube shape of which a right end is closed. A left end portion of the wire compartment 53 is configured to communicate with the motor compartment 52 (open into the motor compartment 52). In addition, the wire compartment 53 includes a wire-exposed portion 59.

The wire-exposed portion 59 extends downward from a right end portion of the wire compartment 53, and is formed substantially in a rectangular tube shape of which a lower end is open. The wire-exposed portion 59 has an upper end configured to communicate with the wire compartment 53 (open into the wire compartment 53). The wire-exposed portion 59 is disposed behind the main control board 35, so as not to overlap the main control board 35 when projected in the vertical direction in a situation where the scanner frame 4 is located in a "closest position" closest to the main body casing 2. Thereby, it is possible to prevent a wire 56 from being pinched and damaged between the wire-exposed portion 59 and the main control board 35 when the scanner frame 4 is swung to the closest position from a "separated position" separated away from the main body casing 2. Further, in the situation where the scanner frame 4 is located in the closest position, a lower end portion of the wire-exposed portion 59 is disposed lower than the upper end portion of the main control board 35. Thereby, it is possible to downsize the printer 1.

The two legs 54 are disposed at a left front end and a right front end portion of the lower wall 57 of the frame main body 51, respectively. Each leg 54 is formed substantially in a rectangular pillar shape protruding downward from the lower wall 57.

As shown in FIGS. 4 and 5, the motor 55 is disposed in the motor compartment 52, and is formed substantially in a cylindrical shape extending in the vertical direction. A lower end portion of the motor 55 is disposed lower than a lower end portion of the wire compartment 53. The motor 55 is connected with a reading sensor (not shown) so as to transmit a driving force to the reading sensor and horizontally move the reading sensor under the reading window 22. Further, the motor 55 is electrically connected with the rear half 35B of the main control board 35 via the wire 56.

The wire 56 is laid to extend in the left-to-right direction inside the wire compartment 53. A left end portion of the wire 56 is electrically connected with a rear end portion of the motor 55. A right end portion of the wire 56 is exposed downward from the wire compartment 53 through the wire-exposed portion 59, and is electrically connected with the rear half 35B of the main control board 35.

The document cover 21 is configured to form an upper half of the scanner frame 4, and is formed substantially in a box shape flattened in the vertical direction. The document cover 21 is swingably supported by a lower end portion of the frame main body 51.

A rear end portion of the scanner frame 4 is swingably supported by a rear end portion of the second supporting frame 32. The scanner frame 4 is configured to swing between the closest position (see FIG. 1) where a front end thereof is closest to an upper side of the catch tray 20 and the separated position (see FIG. 2) where the front end thereof is separated upward farther away from the upper side of the catch tray 20 than when the scanner frame 4 is in the closest position. When the scanner frame 4 is in the closest position, the reading window 22 is placed substantially in a horizontal manner. When the scanner frame 4 is in the separated position, the reading window 22 is placed inclined.

4. Relative Positional Relationship between Main Body Casing and Scanner Frame

When the scanner frame 4 is in the closest position, as shown in FIGS. 4 and 5, the motor compartment 52 is disposed to face the driver-side facing portion 42, above the driver-side facing portion 42. Namely, the motor 55 is disposed on a left rear side of the fuser cover 30, so as not to overlap the conveyance path of the sheet P when projected in the vertical direction. Further, on a left side of the wire-exposed portion 59, a right end portion of the wire compartment 53 is disposed to face the board compartment 41, above the board compartment. Namely, a part, on the left side of the wire-exposed portion 59, of the right end portion of the wire compartment 53 is a board-side facing portion 60.

At this time, as shown in FIG. 5, a lower end portion of the motor compartment 52 is disposed lower than the upper end portion of the main control board 35.

Further, as shown in FIGS. 1 and 2, a left part of the wire compartment 53 relative to the board-side facing portion 60 is disposed to face the upper wall 40 across a distance, above the upper wall 40. In addition, the lower wall 57 of the frame main body 51 is disposed to face the fuser cover 30 across a distance, above the fuser cover 30. Namely, the main body casing 2 and the scanner frame 4 are disposed to face each other across a distance in the vertical direction in a position where the main body casing 2 and the scanner frame 4 overlap the fuser unit 8 in the vertical direction. The two legs 54 are configured to contact a front end portion of the main body casing 2 in respective their positions outside the catch tray 20 in the left-to-right direction.

In the aforementioned image forming operation, as indicated by a virtual line (an alternate long and two short dashes line) in FIG. 1, air heated by heat from the fuser unit 8 flows out to a front side of the printer 1 through a space between the lower wall 57 of the frame main body 51 and the catch tray 20, and concurrently flows out to a rear side of the printer 1 through the slits 47 of the rear wall 46 of the second supporting frame 32 after passing between the upper wall 40 of the second supporting frame 32 and the wire compartment 53.

5. Operations and Advantageous Effects

According to the printer 1 of the embodiment, as shown in FIGS. 2 and 5, the motor compartment 52 for accommodating the motor 55 is disposed at a left rear end portion of the frame main body 51. Further, the board compartment 41 for accommodating the rear half 35B of the main control board 35 is disposed at the upper end portion of the right wall 39R of the second supporting frame 32.

Therefore, it is possible to dispose the motor compartment 52 in a space above the left wall 39L of the second supporting frame 32, and to dispose the board compartment 41 in a space under a right end portion of the frame main body 51.

Thereby, it is possible to dispose the motor compartment 52 in a more spatially-efficient manner and the board compartment 41 than when both the motor compartment 52 and the board compartment 41 are provided at a single side of the printer 1. Consequently, it is possible to downsize the printer 1 including the image reading unit 5 for reading an image of a document sheet.

Further, according to the printer 1 of the embodiment, as shown in FIG. 5, the upper face 41A of the board compartment 41 is disposed higher than the upper face 42A of the driver-side facing portion 42.

Therefore, it is possible to spatially efficiently dispose the motor compartment 52 in a space above the driver-side facing portion 42.

Further, according to the printer 1 of the embodiment, as shown in FIG. 5, the upper end portion of the main control board 35 is disposed higher than the upper face 42A of the driver-side facing portion 42.

Therefore, it is possible to secure a space corresponding to a length of a protruding part of the main control board 32 in the vertical direction, above the driver-side facing portion 42. Consequently, it is possible to dispose the motor compartment 52 in a spatially-efficient manner.

Further, according to the printer 1 of the embodiment, as shown in FIG. 5, the lower end portion of the motor compartment 52 is disposed lower than the upper end portion of the main control board 35.

Namely, the motor compartment 52 and the rear half 35B of the main control board 35 are disposed to overlap each other when viewed along the left-to-right direction.

Thereby, it is possible to reduce a vertical length of the printer 1 and downsize the printer 1 in comparison with a configuration in which the motor compartment 52 is disposed above the main control board 35.

Further, according to the printer 1 of the embodiment, as shown in FIG. 5, the lower end portion of the motor 55 is disposed lower than the lower end portion of the board-side facing portion 60.

Therefore, it is possible to spatially efficiently dispose the board compartment 41 in a space below the board-side facing portion 60.

Additionally, it is possible to secure a space corresponding to a length of a protruding part of the motor 55 in the vertical direction, below the board-side facing portion 60.

Therefore, it is possible to dispose the board compartment 41 in a more spatially-efficient manner, and to further downsize the printer 1.

Further, according to the printer 1 of the embodiment, as shown in FIGS. 1 and 4, the motor 55 is disposed on the left rear side of the image forming unit 3, so as not to overlap the conveyance path of the sheet P when projected in the vertical direction.

Therefore, the motor 55 is allowed to be disposed in a lower position without interfering with the conveyance path of the sheet P.

Further, according to the printer 1 of the embodiment, as shown in FIG. 1, the fuser cover 30 and the lower wall 57 of the frame main body 51 are disposed to face each other across a distance in the vertical direction.

Therefore, it is possible to discharge the heat generated by the fuser unit 8 out of the printer 1 through a space between the lower wall 57 of the frame main body 51 and the fuser cover 30.

Further, according to the printer 1 of the embodiment, as shown in FIG. 4, the motor 55 is disposed on the left rear side of the fuser unit 8.

Therefore, it is possible to dispose the motor 55 in a left-side space of the fuser unit 8. Consequently, it is possible to dispose the motor 55 in a more spatially-efficient manner and further downsize the printer 1.

Hereinabove, the embodiment according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

An only exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiments will be omitted.

5. Modifications

In the aforementioned embodiment, the motor 55 is configured to drive the reading sensor (not shown) of the image reading unit 5. In this respect, the motor 55 may be configured to drive other elements as well as the reading sensor. For instance, when the document cover 21 includes an automatic document feeder (not shown), the motor 55 may be configured to drive the automatic document feeder.

In the aforementioned embodiment, the image reading unit 5 employs a contact image sensor (CIS) as a reading sensor. However, the image reading unit 5 may employ a charge-coupled device (CCD) as a reading sensor.

What is claimed is:

1. An image forming apparatus comprising:
   a first casing disposed on a first side in a first direction; and
   a second casing disposed on a second side opposite to the first side in the first direction, wherein the second casing comprises:
      a scanner configured to read an image on a document sheet;
      a driver configured to drive the scanner; and
      a driver compartment configured to accommodate the driver, the driver compartment disposed at a third-side end portion of the second casing that is on a third side in a second direction perpendicular to the first direction,
   wherein the first casing comprises:
      an image forming unit comprising a photoconductive drum and a charger, the image forming unit configured to form an image on a recording sheet;
      a control board electrically connected with the driver and the scanner and configured to control the scanner; and
      a board compartment configured to accommodate at least a part of the control board, the board compartment disposed at a fourth-side end portion of the first casing that is on a fourth side opposite to the third side in the second direction,
   wherein, in the first direction, at least a part of the driver compartment is disposed on the first side relative to a second-side end of the control board,
   wherein the second casing comprises a wire-exposed portion disposed in such a position as not to overlap the control board in the first direction, on a same side as the control board in the second direction, and
   wherein a wire is inserted into the wire-exposed portion through a first-side end portion of the wire-exposed portion in the first direction, the first-side end portion of the wire-exposed portion in the first direction being disposed on the first side relative to a second-side end portion of the control board in the first direction.

2. The image forming apparatus according to claim 1,
   wherein the first casing comprises a driver-side facing portion disposed to face the driver compartment at a third-side end portion of the first casing in the second direction, and
   wherein, in the first direction, a second-side end of the board compartment is disposed on the second side relative to a second-side end of the driver-side facing portion.

3. The image forming apparatus according to claim 2, wherein, in the first direction, at least a part of the control board is disposed on the second side relative to the second-side end of the driver-side facing portion.

4. The image forming apparatus according to claim 1,
   wherein the second casing comprises a board-side facing portion disposed to face the board compartment at a fourth-side end portion of the second casing in the second direction, and
   wherein, in the first direction, at least a part of the driver is disposed on the first side relative to a first-side end of the board-side facing portion.

5. The image forming apparatus according to claim 1,
   wherein the first casing comprises a conveyance path configured to convey the recording sheet therethrough, and
   wherein the driver is disposed in such a position as not to overlap the conveyance path in the first direction.

6. The image forming apparatus according to claim 5,
   wherein the image forming unit comprises a fuser unit disposed in a position along the conveyance path on the second side relative to the first casing in the first direction, the fuser unit configured to fix the image formed on the recording sheet, and
   wherein the first casing and the second casing are disposed to face each other across a distance in a position where the first casing and the second casing overlap the fuser unit in the first direction.

7. The image forming apparatus according to claim 6, wherein the driver is disposed on the third side relative to the fuser unit in the second direction.

8. The image forming apparatus according to claim 1, further comprising:
- a first frame configured to support a fuser unit, the fuser unit being configured to fix the image formed on the recording sheet; and
- a second frame disposed on a fifth side relative to the first frame in a third direction, the third direction being perpendicular to the first direction and the second direction, the second frame comprising a driver-side facing portion formed to face the driver compartment in the first direction.

9. The image forming apparatus according to claim 8, wherein the control board is supported by the first frame and the second frame.

10. The image forming apparatus according to claim 1, wherein the second casing comprises a wire compartment configured to accommodate the wire, the wire compartment extending from the fourth-side toward the third-side and protruding downward toward the first casing.

11. The image forming apparatus according to claim 10, wherein the driver compartment and the wire compartment are configured to communicate with each other.

* * * * *